(12) United States Patent
Frankovich, III

(10) Patent No.: US 10,140,586 B2
(45) Date of Patent: Nov. 27, 2018

(54) SYSTEM FOR CHARTING AND SCHEDULES ALONGSIDE EQUIPMENT

(71) Applicant: Honeywell International Inc., Morristown, NJ (US)

(72) Inventor: John Joseph Frankovich, III, Henrico, VA (US)

(73) Assignee: Honeywell International Inc., Morris Plains, NJ (US)

( * ) Notice: Subject to any disclaimer, the term of this patent is extended or adjusted under 35 U.S.C. 154(b) by 608 days.

(21) Appl. No.: 14/697,601

(22) Filed: Apr. 27, 2015

(65) Prior Publication Data
US 2016/0314422 A1  Oct. 27, 2016

(51) Int. Cl.
*G06Q 10/06* (2012.01)

(52) U.S. Cl.
CPC . *G06Q 10/06314* (2013.01); *G06Q 10/06315* (2013.01)

(58) Field of Classification Search
CPC .................. G06Q 10/06314; G06Q 10/06315
See application file for complete search history.

(56) References Cited

U.S. PATENT DOCUMENTS

| 7,788,598 | B2 | 8/2010 | Bansal et al. | |
|---|---|---|---|---|
| 8,365,095 | B2 | 1/2013 | Bansal et al. | |
| 8,630,741 | B1* | 1/2014 | Matsuoka | H04L 12/2829 700/12 |
| 8,862,532 | B2* | 10/2014 | Beaulieu | G05B 15/02 706/47 |
| 2002/0004737 | A1* | 1/2002 | McVeigh | G06Q 30/0645 705/313 |
| 2005/0197806 | A1* | 9/2005 | Eryurek | G05B 23/0221 702/188 |
| 2006/0161450 | A1* | 7/2006 | Carey | G06Q 10/06 705/412 |
| 2008/0005677 | A1* | 1/2008 | Thompson | G06Q 10/00 715/744 |
| 2009/0281677 | A1* | 11/2009 | Botich | G06Q 10/00 700/295 |
| 2011/0137711 | A1* | 6/2011 | Singh | G06Q 10/06 705/7.38 |
| 2013/0268125 | A1* | 10/2013 | Matsuoka | G05D 23/1905 700/276 |
| 2014/0249876 | A1* | 9/2014 | Wu | G05B 15/02 705/7.12 |
| 2014/0316581 | A1* | 10/2014 | Fadell | F24F 11/0009 700/276 |

(Continued)

*Primary Examiner* — Sujay Koneru
(74) *Attorney, Agent, or Firm* — Seager Tufte & Wickem LLP

(57) ABSTRACT

A system and approach for charting equipment output values over a historical period of time. A processor may provide the actions for charting, comparison, analysis, detection of the problem, investigation and providing remedial solutions relative to the problem. Charting the values may be done alongside of, for example, an occupancy schedule. If there are not corresponding changes between equipment output values and occupancy, then an investigation may be made to find a problem. If the problem is found, then a correction may be made to solve the problem. The present system and approach for indication of a problem may provide an opportunity to remedy the problem early on thereby resulting in savings of time and costs.

15 Claims, 5 Drawing Sheets

(56) References Cited

U.S. PATENT DOCUMENTS

2015/0308706 A1* 10/2015 Bunker ............... F24F 11/0034
  700/275
2015/0355650 A1* 12/2015 Friedrich ............... G06Q 10/04
  700/276

* cited by examiner

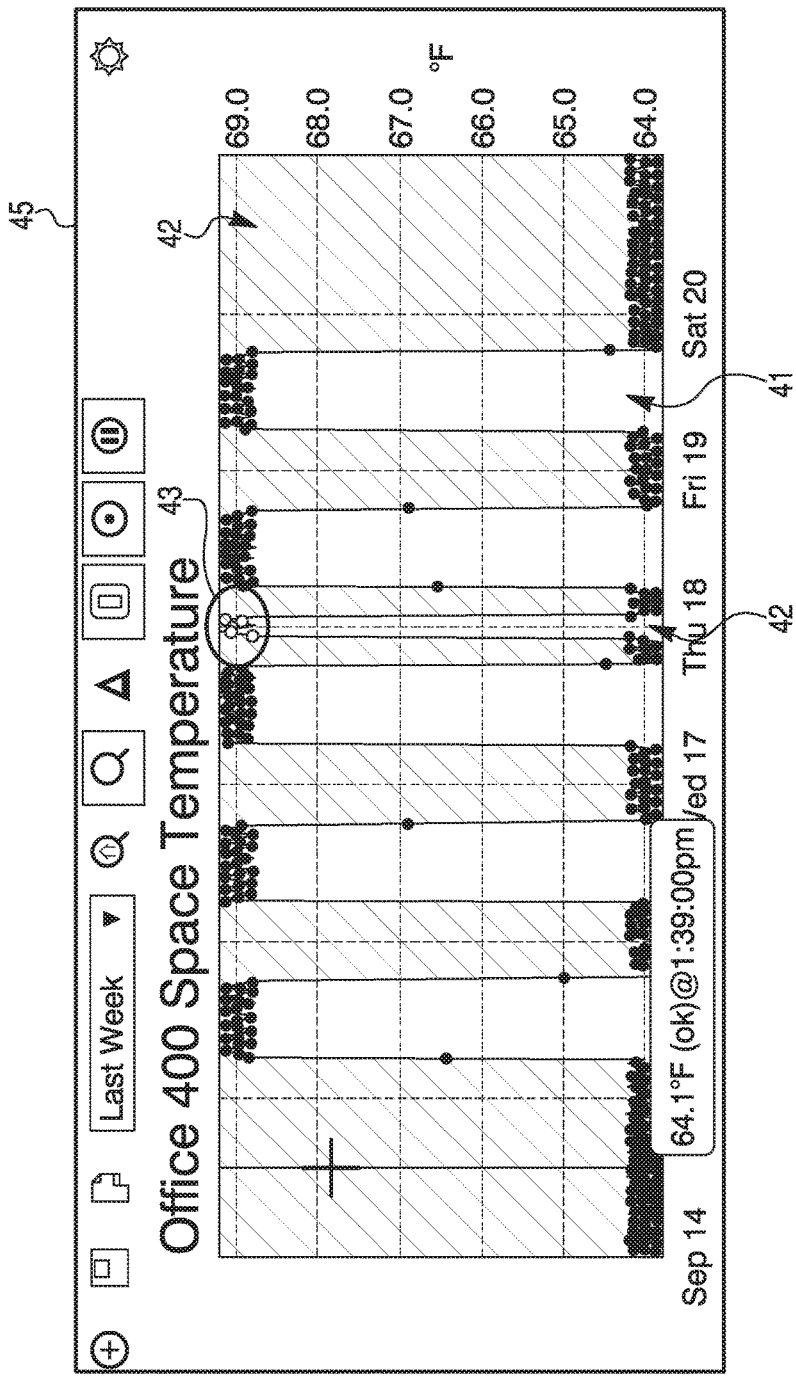

SYSTEM FOR CHARTING AND SCHEDULES ALONGSIDE EQUIPMENT

BACKGROUND

The present disclosure pertains to gathering data, detecting issues in the data, and looking for a way to resolve the issues.

SUMMARY

The disclosure reveals a system and approach for charting equipment output values over a historical period of time. A processor may provide the actions for charting, comparison, analysis, detection of the problem, investigation and providing remedial solutions relative to the problem. Charting the values may be done alongside of, for example, an occupancy schedule. If there are not corresponding changes between equipment output values and occupancy, then an investigation may be made to find a problem. If the problem is found, then a correction may be made to solve the problem. The present system and approach for indication of a problem may provide an opportunity to remedy the problem early on thereby resulting in savings of time and costs.

BRIEF DESCRIPTION OF THE DRAWING

FIG. 5 is a diagram of an occupancy schedule overlaid on top of the space temperature chart of FIG. 4.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Occupancy schedules may often be implemented to optimize equipment usage only when a controlled environment is occupied. When the equipment controlled by these occupancy schedules is charted, the charts may show periodic patterns of higher and lower values based on whether the occupancy schedule is occupied. Charts of the equipment may often be interrogated for consistency of the patterns; if the charts show deviation of these patterns, then it is difficult to discern whether the change in value is because of a problem in the operation of the equipment or because of a change in the occupancy schedule.

There appears to be better way of knowing if the occupancy schedule is the reason for the equipment to change its historical values. If the occupancy schedule is not the reason for the equipment to change its values, then problems with the operation of the equipment or the control of the environment may be detected.

By allowing occupancy schedules to be charted alongside of the equipment they control, deviations in period patterns of the historical values of the equipment may stand out visually on a chart. This may lead to better detection of problems in the equipment or the controlled environment which can save the owner of the equipment and controlled environment money and time.

One may view a chart of various equipment components over a historical period of time, and view its periodic patterns of high and low values. One may notice that by themselves that these patterns appear consistent, but it may be difficult to tell whether their change in values can be attributed to a change in an occupancy schedule or because of a problem with the equipment or the controlled environment.

The occupancy schedule may be charted alongside the equipment it controls. If all of the changes in values of the equipment correspond with a change in the occupancy schedule, then the system may be operating correctly and thus there is no problem. If there is a change in the occupancy schedule, but no change in the equipment values, then there may be a problem. There may also be problems if there is a change in value in the equipment and not a change in the occupancy schedule. Further investigation about the equipment during these two types of deviations may be made and corrections can then be made to the equipment or the environment which could then save the owners of the equipment and the controlled environment money and time.

Figure 4:
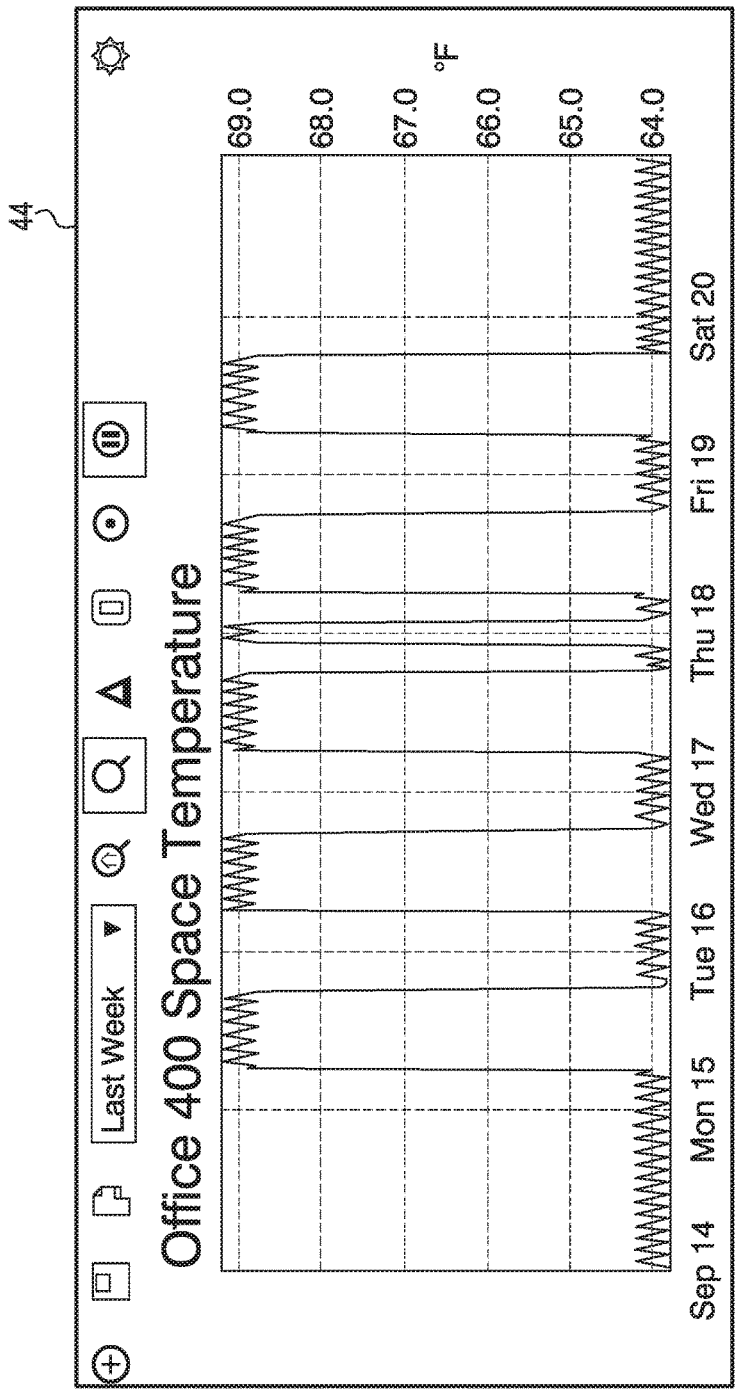
FIG. 4 is a diagram of a space temperature chart of a period's worth of data.

In FIG. 4 and FIG. 5, the diagrams show two charts 44 and 45, respectively, of a space temperature reading of a week's worth of data. Chart 44 of FIG. 4 shows just the space office temperature which seems to have a periodic pattern of high and low values during each day, 69 degrees for occupied and 64 degrees for unoccupied. Everything appears mostly normal in this chart in that the value may be either 69 or 64. The value may be just controlled by changes in the occupancy schedule.

One may now view chart 45 of FIG. 5 that contains an occupancy schedule overlaid on top of the space office temperature chart 44 of FIG. 4. The occupancy chart shows a first shade or color 41 when occupied and second shade or color 42 when unoccupied. Now it appears evident to see that there may be a deviation in the space temperature on Thursday during the middle of the night (highlighted in a third shade or color 43) that does not correspond to a change in the occupancy schedule. The owner of the building may investigate what happened that night to see why the building was using extra energy and may attempt to correct the problem.

Issue tracking techniques may document that schedules should be able to be added to an existing chart. For instance, one may drag and drop Boolean, Enum and Numeric schedules onto an existing chart. The schedules may be good candidates for a visualization on a web chart. A chart view may be registered as a secondary view on these schedules. Manual changes to a schedule may require more data points between the start and end dates. There may already be a current day summary, so that the same logic may be applied to fit a selected time range on a chart, and compare a schedule to a live points, to another schedule, or just regular history. For certain reasons, it may be possible to deprecate a schedule of a current day summary view once a comparison is complete.

Figure 1:
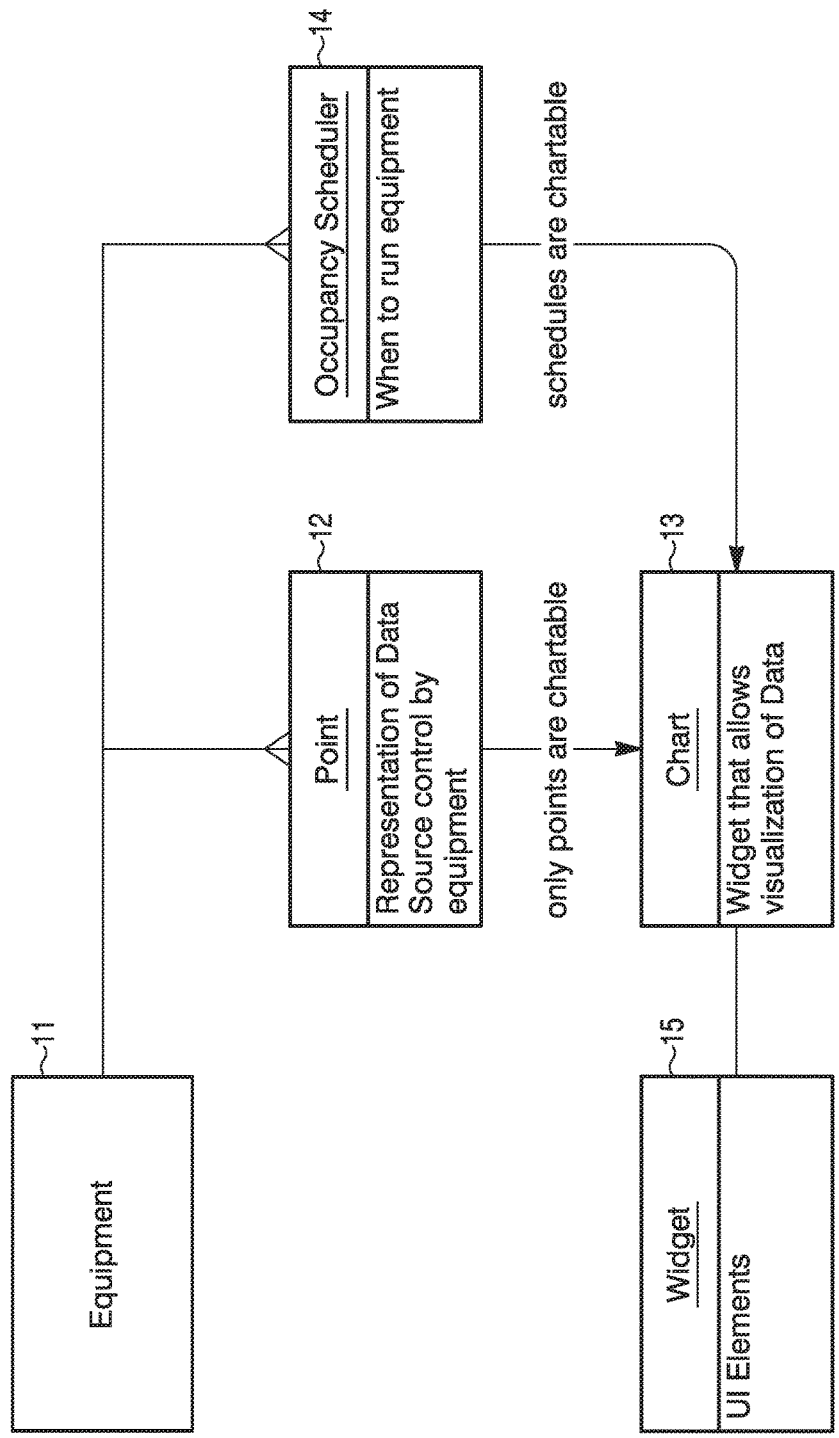
FIG. 1 is a component diagram of the present system and approach.

FIG. 1 is a component diagram of the present system and approach. Equipment at symbol 11 may have a connection to a point at symbol 12 that has a representation of data source control by equipment 11. From symbol 12, only points may be chartable to a chart at symbol 13. Equipment 11 may also have a connection to an occupancy scheduler at symbol 14, where when to run equipment may be indicated. A connection from symbol 14 may go to symbol where schedules are chartable as a whole to a chart at symbol 13. A connection between a widget having user interface elements at symbol 15 and the chart at symbol 13 may permit a widget that allows visualization of data.

Figure 2:
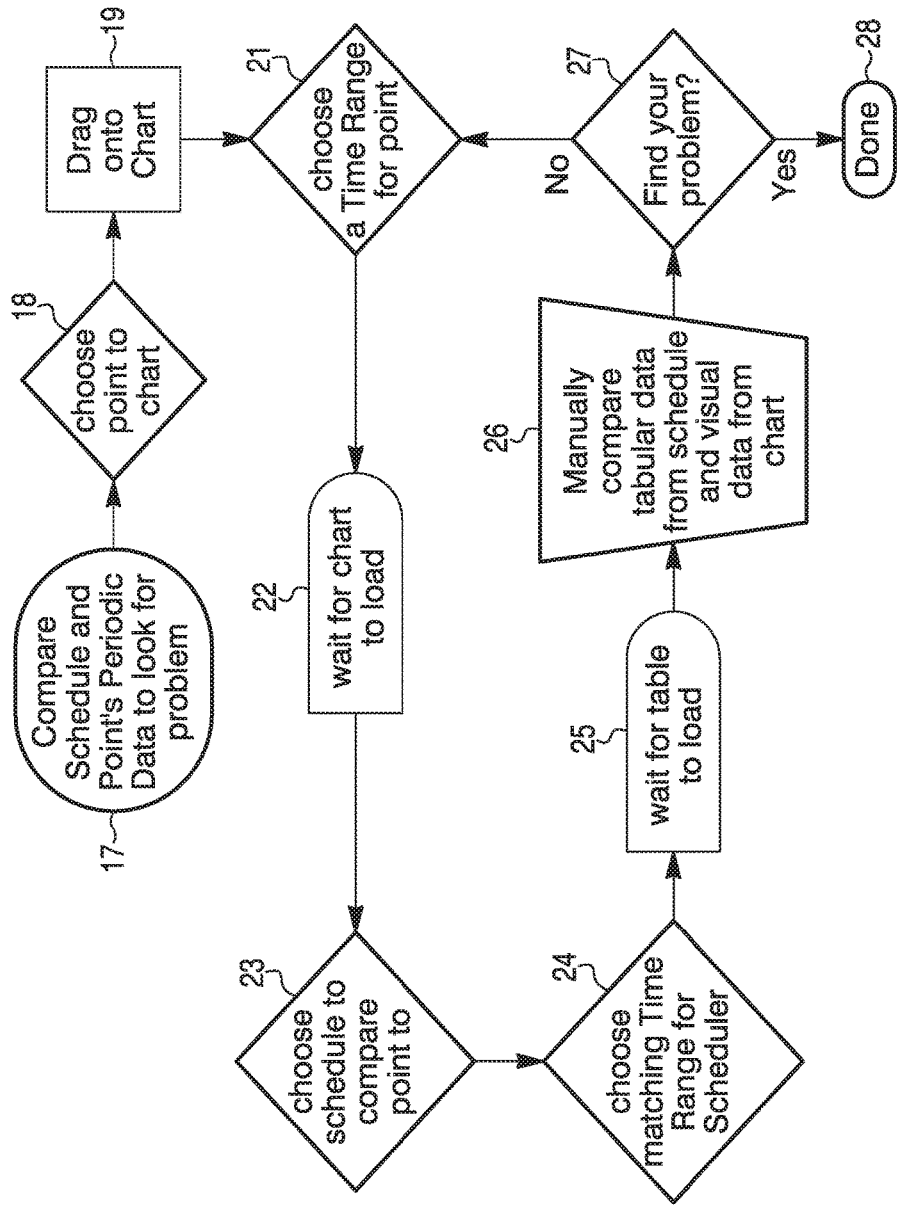
FIG. 2 is a flow diagram of an approach where occupancy schedules may often be used to optimize equipment usage only when a controlled environment is occupied.

In FIG. 2, occupancy schedules may often be used to optimize equipment usage only when a controlled environment is occupied. When the equipment controlled by these occupancy schedules is charted, then the charts may show periodic patterns of higher and lower values based on whether the occupancy schedule is occupied or not. Charts of the equipment may often be interrogated for consistency of these patterns. If the charts show a deviation of these patterns, then it may be difficult to discern whether the change in value is due to a problem in the operation of the equipment or due to a change in the occupancy schedule.

FIG. 2 is a flow diagram relating to the above noted approach. At symbol 17, a schedule and point's periodic data may be compared to look for a problem. A point to chart may be chosen at symbol 18. The point may be dragged onto a chart at symbol 19. A time range for the point may be chosen at symbol 21. Then there may be a wait for the chart to load at symbol 22. At symbol 23, a schedule may be chosen within which to compare the point. A matching time range for a scheduler may be chosen at symbol 24. Then there may be a wait for a table to load at symbol 25. At symbol 26, one may manually compare tabular data from the schedule and visual data from the chart. A question of whether a problem was found or not may be asked at symbol 27. If an answer is yes, then the approach may be regarded as done at symbol 28. If the answer is no, then the actions in symbols 21 through 27 may be repeated.

In another approach, by allowing occupancy schedules to be charted along-side of equipment that they control, deviations in period patterns of the historical values of the equipment may stand out visually in a chart. This action may lead to better detection in issues or problems with the equipment or a controlled environment that can save the owner of the equipment and the controlled environment, money and time.

Figure 3:
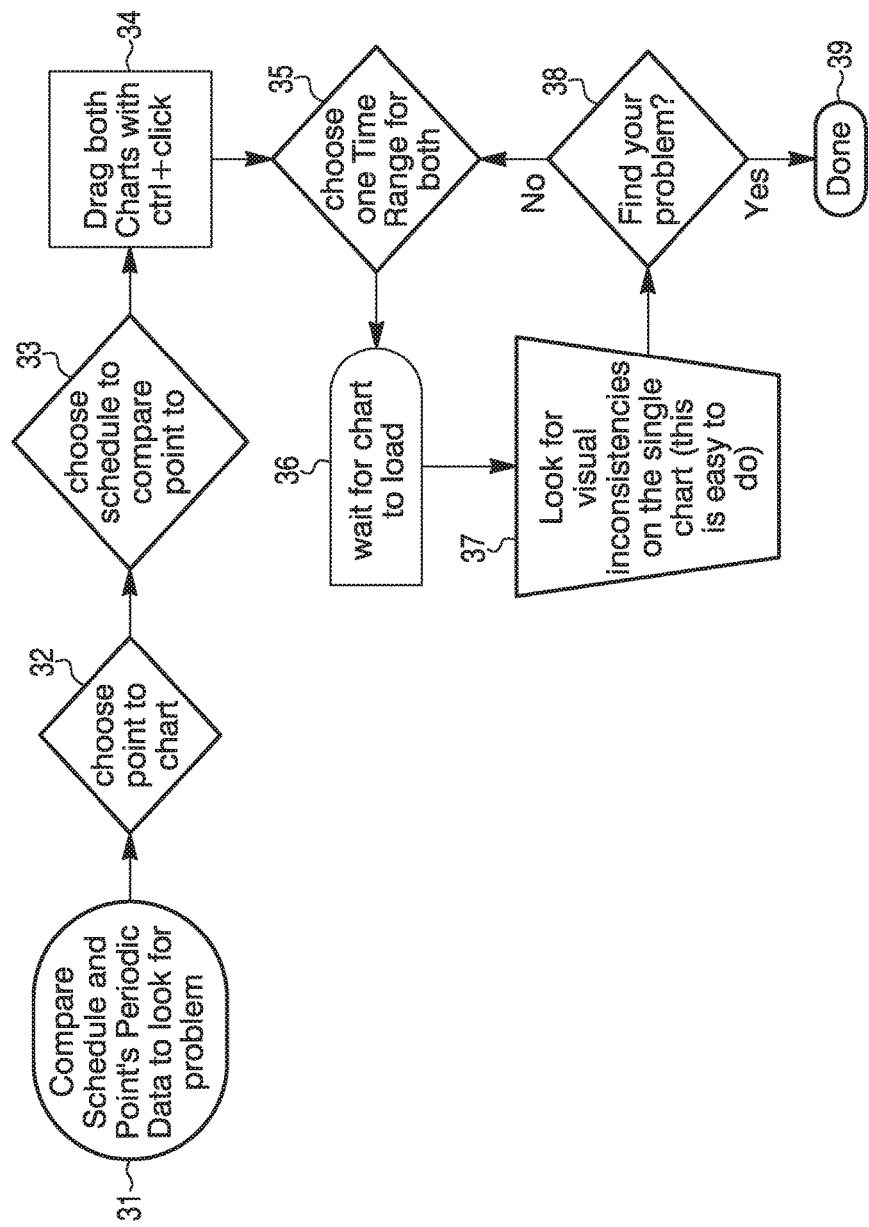
FIG. 3 is a flow diagram of another approach where occupancy schedules are to be charted along-side of equipment that they control, and where any deviations in period patterns of the historical values of the equipment may stand out visually in a chart.

FIG. 3 is a flow diagram of the above-noted approach. A schedule and a point's periodic data may be compared at symbol 31 to look for a problem. A point may be chosen at symbol 32 to chart. At symbol 33, a schedule may be chosen to compare the point to. Both charts may be dragged with a ctrl+click of a user interface, at symbol 34. One time-range may be chosen for both charts at symbol 35. One may wait for a chart to load at symbol 36. At symbol 37, one may look for visual inconsistencies on the single chart, which appears easier to do than the step at symbol 26 in FIG. 2. At symbol 38 of FIG. 3, a question of whether a problem was found or not may be asked at symbol 38. If the answer is yes, then the approach may be regarded as done at symbol 39. If the answer is no, then the actions in symbols 35 through 38 may be repeated.

The systems and approaches noted herein may be implemented in Niagara™, such as a Niagara™ 4 data model and tools incorporating a processor and/or controller. The Niagara™ 4 data model and tools may be products of Tridium™, Inc.

To recap, system for optimizing equipment may incorporate a processor, equipment that has a quality of operation that is indicated by parameter control in view of occupancy of a space, a parameter sensor in a space connected to the processor, an occupancy sensor situated in the space connected to the processor, equipment controlling a parameter connected to the processor, and a display or printer connected to the processor. The parameter may be detected by the parameter sensor in the space. The parameter may be historically recorded over time in a form of a first chart. An occupancy may be detected by the occupancy sensor in the space. The occupancy may be historically recorded over time in a form of a second chart. The first and second charts may be compared by the processor to result in a third chart indicating differences of magnitudes of the parameter and occupancy, which may indicate correlation and anomalies from the differences of magnitudes of the parameter and occupancy. The correlation and anomalies may indicate a condition of the equipment controlling the parameter and detecting occupancy.

The first, second or third chart may be shown on the display.

If the first chart has changes in values of the parameter that correspond to changes in values of occupancy of the second chart, then equipment controlling the parameter of the space may be operating correctly.

If the first chart reveals a change in values of the parameter but without changes in occupancy, then equipment controlling the parameter may be operating incorrectly.

If the second chart reveals a change in an occupancy schedule but without a change in a parameter schedule, then the equipment controlling the parameter may be operating incorrectly.

If the second chart reveals a change inconsistent with an occupancy schedule and a first chart reveals a parameter consistent with a parameter schedule, then a system of occupancy detection and parameter control may be malfunctioning.

If the second chart reveals a change consistent with an occupancy schedule and a first chart reveals a parameter inconsistent with a parameter schedule, then the equipment controlling the parameter may be malfunctioning.

The parameter may be temperature.

The first, second or third chart may be shown in a printout from the printer.

An approach for optimizing equipment may incorporate determining quality of operation of equipment view of occupancy and parameter control of a space, measuring a parameter in a space over a period of time, detecting an amount of occupancy in that space over the period of time, recording the parameter historically over the period of time, recording the amount of occupancy over the period of time, comparing the parameter and the amount of occupancy over the period of time, seeking correlation and anomalies between the parameter and the amount of occupancy over the period of time, and determining whether parameter detection, occupancy detection and parameter control of the space for a given occupancy is satisfactory.

The parameter may be temperature.

If one or more changes in temperature correspond to changes in amounts of occupancy of the space over the period of time, then temperature control of the space may be satisfactory.

If one or more changes in the amount of occupancy occur without a change of temperature over the period of time, then temperature control of the space may be unsatisfactory.

The approach may further incorporate implementing a temperature schedule, and implementing an occupancy schedule. If the amount of occupancy is inconsistent with the occupancy schedule and the temperature is consistent with the temperature schedule, then a system of occupancy detection and temperature control may be malfunctioning.

If the amount of occupancy is consistent with the occupancy schedule and the temperature is inconsistent with the temperature schedule, then equipment controlling the temperature may be malfunctioning.

A mechanism for monitoring equipment may incorporate equipment having a quality of operation at least partially indicated by an output value that controls an environment, a parameter schedule of the environment, and a record of the output value over a period of time of the equipment. The parameter schedule alongside the record of the output value of the equipment may be put into a chart. The parameter schedule may control the equipment as indicated by the output value. Deviations in periodic patterns of the record of the output value of the equipment on the chart may be reviewed to evaluate a correspondence of the parameter schedule with the record of the output value so as to indicate the quality of operation of the equipment.

The parameter may be occupancy.

If changes in output value correspond with changes in the occupancy schedule, then the equipment may be deemed to have a satisfactory quality of operation.

If there is a good correspondence of the occupancy schedule with the output value, then the equipment may be indicated to have a satisfactory quality of operation.

If there is a poor correspondence of the occupancy schedule with the output value, then the equipment may be indicated to have an unsatisfactory quality of operation.

If there is a change in the occupancy schedule and no changes in output value, then the equipment may be indicated to have an unsatisfactory quality of operation.

If there is a change in the output value of the equipment and no change in the occupancy schedule, then the equipment may be indicated to have an unsatisfactory quality of operation.

Further investigation of the equipment may lead to corrections being made to the equipment or the environment.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for optimizing equipment comprising:
   a processor including an occupancy schedule;
   an occupancy sensor situated in a space connected to the processor and configured to detect an occupancy in the space;
   equipment controlling a parameter connected to the processor;
   a parameter sensor in the space connected to the processor and the equipment and configured to detect the parameter over time; and
   a display or printer connected to the processor; and
   wherein:
   the processor is configured to:
      obtain the parameter from the parameter sensor and the occupancy from the occupancy sensor;
      historically record the parameter over time in a form of a first chart;
      historically record the occupancy over time in a form of a second chart;
      compare the occupancy schedule and the first and second charts to produce a third chart configured to identify differences between the occupancy schedule and magnitudes of the parameter and occupancy, which discover:
         correlations between operation of the equipment controlling the parameter, operation of the occupancy sensor, and the occupancy schedule; and
         anomalies indicating deviations from the correlations between the operation of the equipment controlling the parameter, the operation of the occupancy sensor, and the occupancy schedule; and
      the correlation and anomalies indicate a condition of the equipment controlling the parameter, the occupancy sensor detecting the occupancy in the space, and the occupancy schedule.

2. The system of claim 1, wherein the first, second or third chart is shown on the display.

3. The system of claim 1, wherein if the first chart has changes in values of the parameter that correspond to changes in values of occupancy of the second chart, and the occupancy schedule, then the equipment controlling the parameter of the space is operating correctly.

4. The system of claim 1, wherein if the first chart reveals a change in values of the parameter but without changes in occupancy of the second chart, and the occupancy schedule, then the equipment controlling the parameter is operating incorrectly.

5. The system of claim 1, wherein if the second chart reveals changes in values of occupancy and the occupancy schedule but without changes in values of the parameter from the first chart, then the equipment controlling the parameter is operating incorrectly.

6. The system of claim 1, wherein if the second chart reveals a change inconsistent with the occupancy schedule and the first chart reveals a parameter consistent with a parameter schedule, then a system of occupancy detection and parameter control is malfunctioning.

7. The system of claim 1, wherein if the second chart reveals a change consistent with the occupancy schedule and the first chart reveals the parameter inconsistent with a parameter schedule, then the equipment controlling the parameter is malfunctioning.

8. The system of claim 1, wherein the parameter is temperature.

9. The system of claim 1, wherein the first, second or third chart is shown in a printout from the printer.

10. A method for optimizing equipment comprising:
    receiving an occupancy schedule;
    measuring a parameter in a space over a period of time;
    detecting an amount of occupancy in that space over the period of time using an occupancy sensor;
    recording the parameter historically over the period of time;

recording the amount of occupancy over the period of time;

comparing the occupancy schedule, the parameter and the amount of occupancy over the period of time;

seeking correlation between the occupancy schedule, operation of equipment controlling the parameter and operation of the occupancy sensor and anomalies indicating deviations from the correlation between the occupancy schedule, the operation of the equipment controlling the parameter and the operation of the occupancy sensor based on the comparison between the parameter and the amount of occupancy over the period of time;

determining whether parameter detection, occupancy detection, the occupancy schedule, and parameter control of the space for a given occupancy is satisfactory; and generating a first result based on the parameter detection, the occupancy detection, the occupancy schedule, and the parameter control of the space for a given occupancy being satisfactory and a second result based on the parameter detection, the occupancy detection, the occupancy schedule, and the parameter control of the space for a given occupancy being unsatisfactory.

11. The method of claim 10, wherein the parameter is temperature.

12. The method of claim 11, wherein if one or more changes in temperature correspond to changes in amounts of occupancy of the space over the period of time, then temperature control of the space is satisfactory.

13. The method of claim 11, wherein if one or more changes in the amount of occupancy occur without a change of temperature over the period of time, then temperature control of the space is unsatisfactory.

14. The method of claim 11, further comprising:

implementing a temperature schedule; and wherein if the amount of occupancy is inconsistent with the occupancy schedule and the temperature is consistent with the temperature schedule, then a system of occupancy detection and temperature control is malfunctioning.

15. The method of claim 14, wherein if the amount of occupancy is consistent with the occupancy schedule and the temperature is inconsistent with the temperature schedule, then equipment controlling the temperature is malfunctioning.

* * * * *